United States Patent
Choi

(10) Patent No.: US 9,755,735 B2
(45) Date of Patent: Sep. 5, 2017

(54) OPTICAL END MONITORING APPARATUS AND METHOD OF OPERATING THE APPARATUS

(71) Applicant: Young-bok Choi, Daejeon (KR)

(72) Inventor: Young-bok Choi, Daejeon (KR)

(73) Assignee: FIBERPIA CO., LTD., Daejeon (KR)

( * ) Notice: Subject to any disclaimer, the term of this patent is extended or adjusted under 35 U.S.C. 154(b) by 0 days.

(21) Appl. No.: 15/193,421

(22) Filed: Jun. 27, 2016

(65) Prior Publication Data

US 2017/0222714 A1    Aug. 3, 2017

(30) Foreign Application Priority Data

Jan. 28, 2016  (KR) .......................... 10-2016-0010780

(51) Int. Cl.
*H04B 10/073* (2013.01)

(52) U.S. Cl.
CPC .............. *H04B 10/0731* (2013.01)

(58) Field of Classification Search
CPC .... H04J 14/02; H04J 14/0221; H04J 14/0213; H04Q 11/0005; H04B 10/00; H04B 10/0731

See application file for complete search history.

(56) References Cited

U.S. PATENT DOCUMENTS

2006/0216038 A1* 9/2006 Yokota ............... H04B 10/0791
                                              398/177
2012/0328304 A1* 12/2012 Ikushima ........... H04B 10/2503
                                              398/140

* cited by examiner

*Primary Examiner* — Ted Wang
(74) *Attorney, Agent, or Firm* — Antonio Ha & U.S. Patent, LLC

(57) ABSTRACT

An optical end monitoring apparatus in an optical communication network includes an optical transmitting unit, an optical receiving unit, and a decision unit. The optical transmitting unit generates first and second optical signals with different wavelengths and transmits the first and second optical signals to the optical end terminal over an optical cable. The optical receiving unit receives reflection signals corresponding to the respective first and second optical signals. The decision unit determines whether the optical end terminal is connected to the optical cable using a difference between magnitudes of the respective received reflection signals.

10 Claims, 3 Drawing Sheets

OPTICAL END MONITORING APPARATUS AND METHOD OF OPERATING THE APPARATUS

TECHNICAL FIELD

The present invention relates to an apparatus for detecting an optical end terminal, and more particularly to, an apparatus and a method for detecting unused service lines based on a determination on whether the optical end terminal is connected to an optical cable, whether the optical end terminal is powered on or off, or whether the optical cable is cut off.

DISCUSSION OF THE RELATED ART

As shown in FIG. 1, an optical access network is configured to connect an optical line terminal, which is a terminal at a provider side, with an optical end terminal (OET) such as an optical network terminal through an optical (power) distribution unit over an optical cable, etc.

Removals or maintenances due to subscriber's withdrawal, move-out, etc. generally occur at a location between an optical distribution unit and an optical end terminal. Thus, it is needed to determine whether a subscriber's optical end terminal is connected to a transmission optical cable, or whether the optical cable is physically cut off at the end of the optical access network.

If a new subscriber signs up for the service, an optical fiber identifier may be used or a door-to-door visit may be conducted for searching unused ports around a subscriber's site.

A technique using the optical fiber identifier for checking whether the optical end terminal is connected to the transmission optical cable may work only when the optical end terminal is powered on. However, if the subscriber turns off the optical end terminal or when the optical cable is physically cut off while the subscriber moves out, this technique might not work. In this case, it may be needed to visit the subscriber's home to check whether the optical end terminal is connected to the optical cable. Thus, this may result in much waste in time and cost.

SUMMARY

An exemplary embodiment of the present invention provides an apparatus or a method for detecting whether an optical end terminal is connected to an optical cable and/or whether the optical end terminal is powered on or off.

In one aspect there is provided an optical end monitoring apparatus in an optical communication network connected over an optical cable. The apparatus includes an optical transmitting unit, an optical receiving unit, and a decision unit. The optical transmitting unit is configured to generate a first optical signal with a first wavelength and a second optical signal with a second wavelength, and to transmit the generated first and second optical signals toward an optical end terminal over the optical cable. The optical receiving unit is configured to receive a first reflection signal corresponding to the first optical signal and a second reflection signal corresponding to the second optical signal, and to provide first and second magnitudes of the respective first and second reflection signals to a decision unit. The decision unit is configured to determine whether the optical end terminal is connected to the optical cable at an optical end of the optical communication network, using a difference between the first and second magnitudes. The decision unit determines that the optical end terminal is not connected to the optical cable when the difference between the first and second magnitudes is equal to or less than a first predetermined value. The decision unit determines that the optical end terminal is connected to the optical cable when the difference between the first and second magnitudes is more than the first predetermined value.

In an exemplary embodiment of the present invention, the optical receiving unit may further be configured to receive a third optical signal generated by the optical end terminal. The decision unit may determine that the optical end terminal is connected and powered on when a magnitude of the received third optical signal is more than a second predetermined value. Further, the decision unit may determine that the optical end terminal is connected and powered off when the magnitude of the received third optical signal is equal to or less than the second predetermined value.

In an exemplary embodiment of the present invention, the first and second wavelengths may be selected such that a difference between first and second reflection coefficients of the respective first and second optical signals with respect to at least one optical element in the optical end terminal is more than a third predetermined value.

In an exemplary embodiment of the present invention, the optical transmitting unit includes a first light source generating the first optical signal and a second light source generating the second optical signal.

In an exemplary embodiment of the present invention, the optical receiving unit may include a first optical filter, a first light detection element, a second optical filter, and a second light detection element. The first optical filter may pass the first reflection signal with the first wavelength. The first light detection element may receive an output signal of the first optical filter to detect a first magnitude of the output signal of the first optical filter. The second optical filter may pass the second reflection signal with the second wavelength. The second light detection element may receive an output signal of the second optical filter to detect a second magnitude of the output signal of the second optical filter.

In another aspect there is provided an optical end monitoring in an optical communication network connected over an optical cable. The method includes checking whether an upstream signal transmitted from an optical end terminal is received, wherein the optical end terminal is in vicinity of an optical end of the optical communication network, determining that the optical end terminal is powered on when the upstream signal is received, transmitting a first optical signal with a first wavelength and a second optical signal with a second wavelength toward the optical end terminal over the optical cable when the upstream signal is not received, receiving a first reflection signal corresponding to the first optical signal and a second reflection signal corresponding to the second optical signal, and determining whether the optical end terminal is connected to the optical cable based on a difference between a first magnitude of the first reflection signal and a second magnitude of the second reflection signal.

In an exemplary embodiment of the present invention, checking whether the upstream signal transmitted from the optical end terminal is received may include: determining that the upstream signal is not received when a magnitude of the upstream signal is equal to or less than a first determined value; and determining that the upstream signal is received when the magnitude of the upstream signal is more than the first determined value.

In an exemplary embodiment of the present invention, determining whether the optical end terminal is connected to the optical cable based on the difference between the first magnitude of the first reflection signal and the second magnitude of the second reflection signal may include: determining that the optical end terminal is not connected to the optical cable when the difference between the first magnitude and the second magnitude is equal to or less than a second predetermined value; and determining that the optical end terminal is connected to the optical cable and powered off when the difference between the first magnitude and the second magnitude is more than the second predetermined value.

In an exemplary embodiment of the present invention, the first and second wavelengths may be selected such that a difference between first and second reflection coefficients of the respective first and second optical signals with respect to at least one optical element in the optical end terminal is more than a third predetermined value.

In an exemplary embodiment of the present invention, a wavelength of the upstream signal and the first wavelength of the first optical signal may be the same as each other, and the first optical signal may not be generated prior to the checking whether the upstream signal transmitted from the optical end terminal is received.

The optical end monitoring apparatus and/or the optical end monitoring method according to an embodiment of the present invention allows to easily check whether the optical end terminal is connected to an optical cable, or whether the optical end terminal is powered on or off without conducting a door-to-door visit.

DETAILED DESCRIPTION OF THE EMBODIMENTS

Hereinafter, preferred exemplary embodiments of the present invention will be described with reference to accompanying drawings in order to describe the present invention in detail to the extent that a person skilled in the art to which the invention pertains can easily enforce the technical concept of the present invention. It will be understood that various modifications in form and details may be made thereto without departing from the spirit and scope of the present invention.

Figure 1:
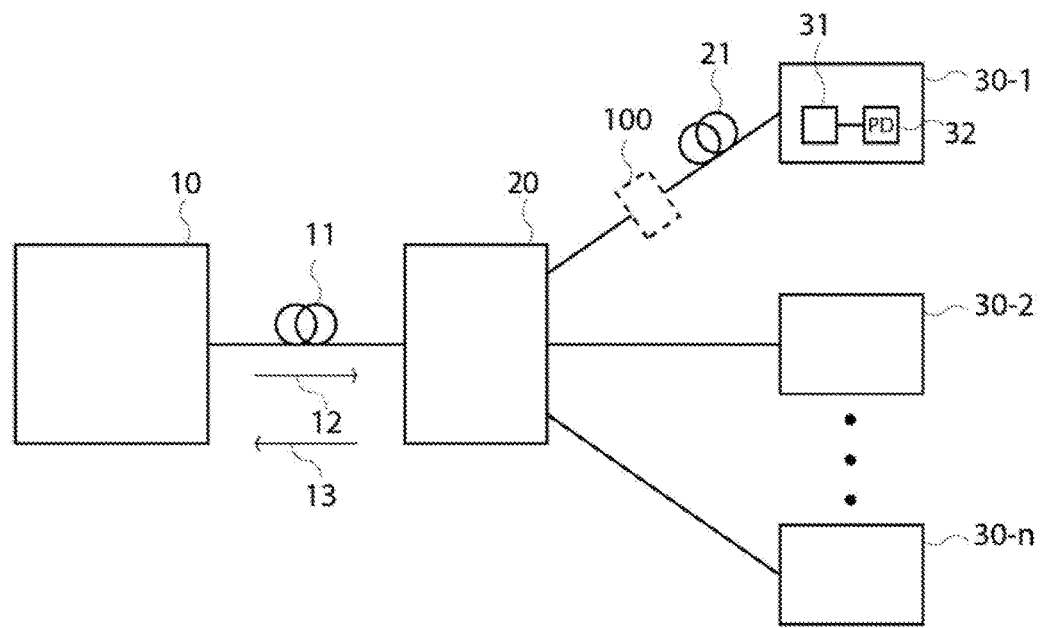
FIG. 1 illustrates an example of an optical access network according to a non-limiting exemplary embodiment of the present disclosure.
Figure 2:
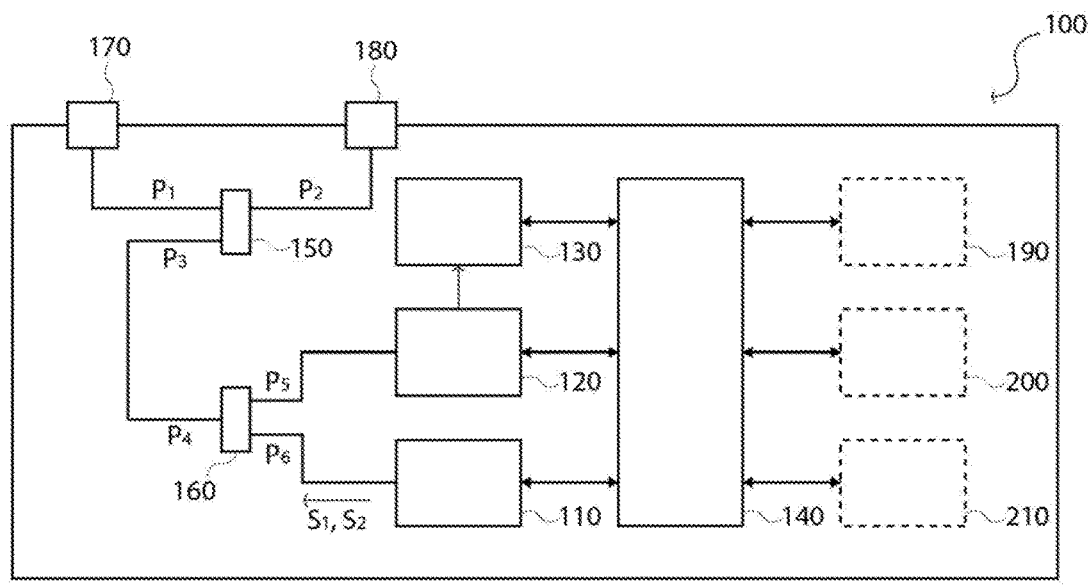
FIG. 2 illustrates a block diagram of an optical end monitoring apparatus according to a non-limiting exemplary embodiment of the present disclosure.
Figure 3A:
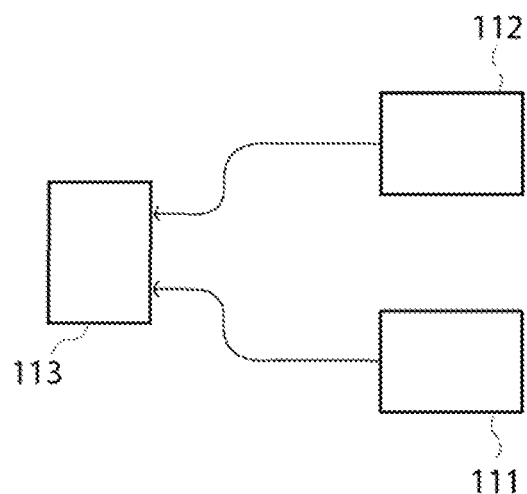
FIGS. 3A-3C each illustrates a block diagram of the optical transmitting unit of the optical end monitoring apparatus of FIG. 2 according to a non-limiting exemplary embodiment of the present disclosure.
Figure 3B:
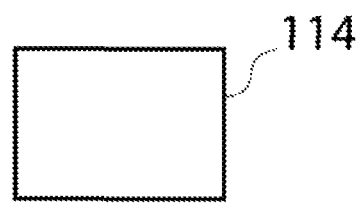
Figure 3C:
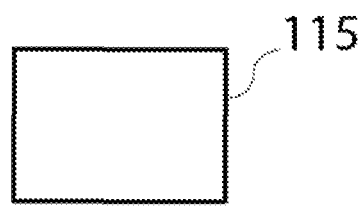
Figure 4:
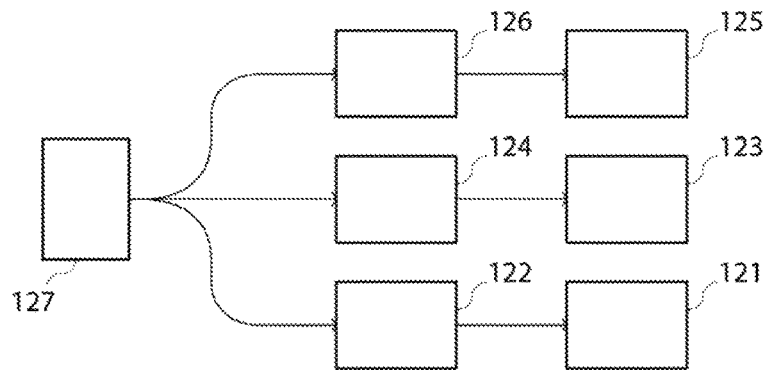
FIG. 4 illustrates a block diagram of the optical receiving unit of an optical end monitoring apparatus of FIG. 2 according to a non-limiting exemplary embodiment of the present disclosure.

FIG. 1 illustrates an example of an optical access network (e.g., Fiber-To-The-Home) according to a non-limiting exemplary embodiment of the present disclosure. FIG. 2 illustrates a block diagram of an optical end monitoring apparatus according to a non-limiting exemplary embodiment of the present disclosure. FIGS. 3A-3C each illustrates a block diagram of the optical transmitting unit of the optical end monitoring apparatus of FIG. 2 according to a non-limiting exemplary embodiment of the present disclosure. FIG. 4 illustrates a block diagram of the optical receiving unit of the optical end monitoring apparatus of FIG. 2 according to a non-limiting exemplary embodiment of the present disclosure.

Referring to FIG. 1, the FTTH based optical access network 1 may include an optical line terminal 10, an optical distribution device 20, and a plurality of optical end terminals 30-1 to 30-N. For example, each of the plurality of optical end terminals 30-1 to 30-N may be located at an optical end of the optical access network or near a subscriber' (or users) site. A downstream signal 12 provided from the optical line terminal 10 may be transmitted to the optical distribution device 20 over an optical cable 11. The optical distribution device 20 may divide power of the downstream signal 12 and transmit the divided downstream signal 12 to each of the plurality of optical end terminals 30-1 to 30-N over an optical cable 21. Here, N is a positive integer.

On the other hand, unlike to the downstream signal 12, an upstream signal 13 may be generated by each of the plurality of optical end terminals 30-1 to 30-N, merged in power through the optical distribution device 20, and transmitted toward the optical line terminal 10 over the optical cable 11.

FIG. 1 is only an embodiment of an optical communication network shown for the purpose of Illustration, exemplary embodiments of the present invention are not limited to the optical communication network with structure and configuration described with reference to FIG. 1.

In an exemplary embodiment of the present invention, a wavelength λdown of the downstream signal 12 may be located at about 1490 nm or within a predetermined range in vicinity of the 1490 nm wavelength, and a wavelength λup of the upstream signal 13 may be located at about 1310 nm or within a predetermined range in vicinity of the 1310 nm wavelength. However, the wavelengths λdown and λup of the present invention are not limited thereto. For example, the wavelength λdown of the downstream signal 12 may be located at about 1550 nm or within a predetermined range in vicinity of the 1550 nm wavelength.

In an exemplary embodiment of the present invention, the optical end monitoring apparatus 100 may be positioned between the optical distribution device 20 and each of the plurality of optical end terminals 30-1 to 30-N. For example, if the first optical end terminal 30-1 is a device positioned at or around an optical end of the optical access network 1 which is a subject to be monitored, the optical end monitoring apparatus 100 may be moved to the first optical end terminal 30-1 as close as possible, so that a link between the optical end monitoring apparatus 100 and the first optical end terminal 30-1 does not include an optical element with different losses or reflection coefficients depending on wavelengths of input optical signals.

Hereinafter, the first optical end terminal 30-1 will be regarded as a user device (or terminal) positioned at the optical end which is a subject to be monitored for the purpose of illustration, however exemplary embodiments of the present invention are not limited thereto, and any of the second to N-th optical end terminals 30-2 to 30-N may be the user device positioned at the optical end which is the subject to be monitored.

In an exemplary embodiment of the present invention, each of the plurality of optical end terminals 30-1 to 30-N may include at least one optical element (e.g., an optical filter) having different losses or reflection coefficients depending on wavelengths of input optical signals.

Referring to FIG. 2, the optical end monitoring apparatus 100 according to an embodiment of the present invention may include an optical transmitting unit 110, an optical receiving unit 120, a decision unit 130, a control unit 140, first and second optical couplers 150, 160, an input port 170, and output port 180.

In an exemplary embodiment of the present invention, the optical end monitoring apparatus 100 may further include a display unit 190 configured to display an operation state of the optical end monitoring apparatus 100 or measurement or decision results thereby, an input/output (I/O) unit 200 (not shown in figure) such as a keyboard, a mouse, or the like, and a network unit 210 configured to communicate with an external device. However, exemplary embodiments of the present invention are not limited thereto.

In an exemplary embodiment of the present invention, the input port 170 may be configured to receive the downstream signal 12 output from the optical line terminal 10, the output port 180 may be configured to output the downstream signal 12, or first and second optical signals S1 and S2, which are generated from the optical end monitoring apparatus 100, toward the first optical end terminal 30-1.

For example, the downstream 12 may be input through the input port 170, and incident to the optical cable 21 through first and second ports P1 and P2 of the first optical coupler 150 and the output port 180. The downstream signal 12 incident to the optical cable 21 may be transmitted toward the first optical end terminal 30-1 which is a subject to be monitored.

If the first optical end terminal 30-1 is connected to the optical cable 21 and is powered on to be in a normal operation, the first optical end terminal 30-1 may generate an upstream signal 13 with an upstream wavelength λup to output the upstream signal 13 toward the optical end monitoring apparatus 100.

Accordingly, if the upstream signal 13 is received, the optical end monitoring apparatus 100 may determine that the first optical end terminal 30-1 is connected to the optical cable 21 and powered on to be in a normal operation, and may display, through the display unit 190, to the effect of the decision made above; for example "OET NORMAL").

On the other hand, if the upstream signal 13 is not received, the optical end monitoring apparatus 100 may determine that the first optical end terminal 30-1 is not in a normal operation and may display, through the display unit 190, to the effect of the decision made above; for example "OET ABNORMAL AND GO TO NEXT STEP").

In an exemplary embodiment of the present invention, when the optical end monitoring apparatus 100 detects the upstream signal 13, the optical transmitting unit 110 may be powered off or the first and second optical signals S1 and S2 might not be generated in the optical transmitting unit 110.

Further, in an exemplary embodiment of the present invention, the upstream signal 13 may be received through the output port 180 of the optical end monitoring apparatus 100, and may be input to the optical receiving unit 120 through the second and third ports P2 and P3 of the first optical coupler 150 and the first and second ports P4 and P5 of the second optical coupler 160, and the optical receiving unit 120 may detect a magnitude of the upstream signal 13.

In an exemplary embodiment of the present invention, when a magnitude of the upstream signal 13 is greater than a first predetermined value, the optical end monitoring apparatus 100 may determine that the upstream signal 13 is received. In addition, when the magnitude of the upstream is equal to or less than the first predetermined value, the optical end monitoring apparatus 100 may determine that the upstream signal 13 is not received. However, exemplary embodiments of the present invention are not limited thereto.

The aforementioned first determined value, may be, for example, a minimum power (e.g., power sensitivity) which can be measured by the optical receiving unit 120.

When the upstream signal 13 can be detected, the optical end monitoring apparatus 100 may determine that the upstream signal 13 is received. In addition, when the upstream signal 13 cannot be detected, the optical end monitoring apparatus 100 may determine that the upstream signal 13 is not received.

Hereinafter, operations of the optical end monitoring apparatus 100 in case where it is determined that the first optical end terminal 30-1 is not in a normal operation will be described below.

Here, if the upstream signal 13 generated by the first optical end terminal 30-1 is not received, it can be inferred that the first optical end terminal 30-1 is connected to the optical cable 21 and is powered off (which will be referred to as "Case 1"), or the first optical end terminal 30-1 is not connected to the optical cable 21 regardless of whether the first optical end terminal 30-1 powered on or off (which will be referred to as "Case 2").

In order to determine on which one of Case 1 and Case 2 the connection status of the first optical end terminal 30-1 corresponds to, the optical end monitoring apparatus 100 or the optical end monitoring method according to an embodiment of the present invention may transmit two optical signals having different wavelengths from each other toward the first optical unit 30-1 and detect a difference in magnitude between two reflection signals corresponding to the two optical signals, respectively.

When the first optical end terminal 30-1 is not connected to the optical cable 21 (e.g., Case 2), the two optical signals having the different wavelengths from each other may be reflected at a cutting edge between the first optical end terminal 30-1 and the optical cable 20 to be returned to the optical end monitoring apparatus 100. In this case, since the two optical signals travel along identical optical paths, the magnitudes of the two reflection signals corresponding to the two optical signals, respectively may be the same as each other, or the difference of the magnitudes of the two reflection signals may be within a predetermined value.

On the other hand, when the first optical end terminal 30-1 is connected to the optical cable 21 (e.g., Case 1), the two optical signals having the different wavelengths from each other may be input to the first optical end terminal 30-1. Further, the two optical signals input to the first optical end terminal 30-1 may pass through one or more optical elements in the first optical end terminal 30-1, and/or may be reflected thereby to be returned to the optical end monitoring apparatus 100. In this case, if at least one of the one or more optical elements in the first optical end terminal 30-1 has high wavelength dependencies in terms of optical losses (e.g., Insertion losses) or reflection coefficients, the difference in magnitude between the reflection signals corresponding to the two optical signals may be increased in proportion to the wavelength dependencies.

For example, when a certain optical element has a "wavelength dependency", it can be understood that the optical element has different values depending on a wavelength of an optical signal input thereto.

Referring back to FIG. 2, in order to determine on which one of Case 1 and Case 2 the connection status of the first optical end terminal 30-1 corresponds to, the optical transmitting unit 110 may generate a first optical signal S1 having a first wavelength λ1 and a second optical signal S2 having a second wavelength λ2 in response to a control of the control unit 140. The generated first and second optical signals S1 and S2 may be merged in terms of power through the optical coupler 160, incident to the optical cable 21 through the ports P3 and P2 of the first optical coupler 150 and the output port 180, and transmitted toward the first optical end terminal 30-1.

The first and second reflection signals S1_R and S2_R of the respective first and second optical signals S1 and S2, which are reflected through the first optical end terminal 30-1 or a cutting edge of the optical cable 21, may be input to the optical end monitoring apparatus 100 through the output port 180. The input first and second reflection signals S1_R and S2_R may further be input to the optical receiving unit 120 through the ports P2 and P3 of the first optical coupler 150 and the ports P4 and P5 of the second optical coupler 160. The optical receiving unit 120 may detect magnitudes of the respective first and second reflection signals S1_R and S2_R according to the control of the control unit 140 and provide detected results to the decision unit 130.

In an exemplary embodiment of the present invention, the first optical coupler 150 may have a power division ratio of 5:95 or 10:90, and the second optical coupler 160 may have a power division ratio of 50:50. However, exemplary embodiments of the present invention are not limited thereto.

When the magnitudes of the respective first and second reflection signals S1_R and S2_R are not the same as each other or a difference between the magnitudes of the respective first and second reflection signals S1_R and S2_R is equal to or smaller than a second predetermined value, the decision unit 130 may determine that the first optical end terminal 30-1 is not connected to the optical cable 21, but cut off, or patch codes are disconnected (i.e., Case 2) and may display, through the display unit 190, to the effect of the decision made above; for example "CABLE CUT".

When the difference between the magnitudes of the respective first and second reflection signals S1_R and S2_R is greater than the second predetermined value, the decision unit 130 may determine that the first optical end terminal 30-1 is connected to the optical cable 21 and is powered off (i.e., Case 1) and may display, through the display unit 190, to the effect of the decision made above; for example "OET OFF".

In an exemplary embodiment of the present invention, when the difference between the magnitudes of the respective first and second reflection signals S1_R and S2_R ranges from about 5 dB to about 10 dB, the decision unit 130 may determine that the first optical end terminal 30-1 is in a state of Case 1, and when the difference between the magnitudes of the respective first and second reflection signals S1_R and S2_R ranges from about 0 dB to about 5 dB, the decision unit 130 may determine that the first optical end terminal 30-1 is in a state of Case 2.

In an exemplary embodiment of the present invention, when wavelengths λdown and λup of the respective downstream and upstream signals 12 and 13 are about 1490 nm and about 1310 nm, respectively, first and second wavelengths λ1 and λ2 of the respective first and second optical signals S1 and S2 may be about 1450 nm and about 1310 nm, respectively. Here, while the second wavelength λ2 is the same as the wavelength λup of the upstream signal 13, exemplary embodiments of the present invention are not limited thereto, and the second wavelength λ2 and the wavelength λup may be different from each other. In addition, the first and second wavelengths λ1 and λ2 may be selected to have a difference between the reflection coefficients corresponding to the wavelengths, with respect to at least one optical element in the first optical end terminal 30-1, greater than a predetermined value (e.g., 5 dB or 10 dB).

In an exemplary embodiment of the present invention, the first wavelength λ1 may be selected to minimize a bending loss generated in the optical cable 21. When the second wavelength λ2 is selected to be about 1310 nm, the first wavelength λ1 may be selected to be about 1450 nm, and thus the bending loss of the optical cable 21 may be minimized and the condition in which the difference between the reflection coefficients with respect to at least one optical element in the first optical end terminal 30-1 is greater than the predetermined value may be satisfied. However, exemplary embodiments of the present invention are not limited thereto. For example, the first and second wavelengths λ1 and λ2 may be about 1550 nm and about 1310 nm, respectively.

Table 1 shows magnitudes of the respective first and second reflection signals S1_R and S2_R, which are detected by the optical receiving unit 120 in the Cases 1 and 2, when the first and second wavelengths λ1 and λ2 are 1450 nm and 1310 nm, respectively. However, exemplary embodiments of the present invention are not limited thereto.

TABLE 1

| Wavelength | Case 1 | Case 2 |
| --- | --- | --- |
| 1310 nm (S2_R) | −42 dBm | −50 dBm |
| 1450 nm (S1_R) | −42 dBm | −42 dBm |

Referring to FIG. 3A, the optical transmitting unit 110 according to an exemplary embodiment of the present invention may first and second light sources 111 and 112, and an optical combiner 113 such as an optical coupler, a wavelength division multiplex (WDM) device, or the like.

Referring to FIG. 3B, the optical transmitting unit 110 may include a tunable light source 114. Referring to FIG. 3C, the optical transmitting unit 110 may include a light emitting diode (LED) 115.

In an exemplary embodiment of the present invention, a light source output from the optical transmitting unit 110 may be a continuous wave (CW) optical signal with constant power.

Referring to FIG. 4, in one embodiment, the optical receiving unit 120 may include first to third photo-detectors 121, 123, and 125, first to third optical filters 122, 124, and 126, and an optical coupler 127. Each of the first to third photo-detectors 121, 123, and 125 may perform an optical-to-electrical conversion on the light source input thereto. The upstream signal 13 and first and second reflection signals S1_R and S2_R may be input through the output port 180, and incident to the optical coupler 127 through the ports P2 and P3 of the first optical coupler 150 and the ports P4 and P5 of the second optical coupler 160 to be divided into three optical paths.

For example, the upstream signal 13 and first and second reflection signals S1_R and S2_R may be divided to be incident to each of the first to third optical filters 122, 124, and 126 and received by the respective first to third photo-detectors 121, 123, and 125 to detect a magnitude of a respective one thereof. That is, each of the first to third optical filters 122, 124, and 126 may be configured to selectively pass a corresponding one of the wavelength λ1, λ2, and λup.

Although it is not illustrated in figures, in one embodiment, each of the first to third optical filters 122, 124, and 126 may be implemented using a thin-film filter, a grating filter, etc.

However, the optical receiving unit 120 is only an exemplary embodiment, and exemplary embodiments of the present invention with respect to a configuration of the optical receiving unit 120 are not limited thereto. For example, although not illustrated in figures, the first to third optical filters 122, 124, and 126 of the optical receiving unit 120 may be implemented with a single tunable optical filter, and the first to third photo-detectors 121, 123, and 125 thereof may be implemented with a single photo-detector. Also, when the upstream signal 13 and the second wavelength λ2 are the same as each other, one of the second and third optical filters 124 and 126 and one of the second and third photo-detectors 123 and 125 may be implemented in the optical receiving unit 120.

Figure 5:
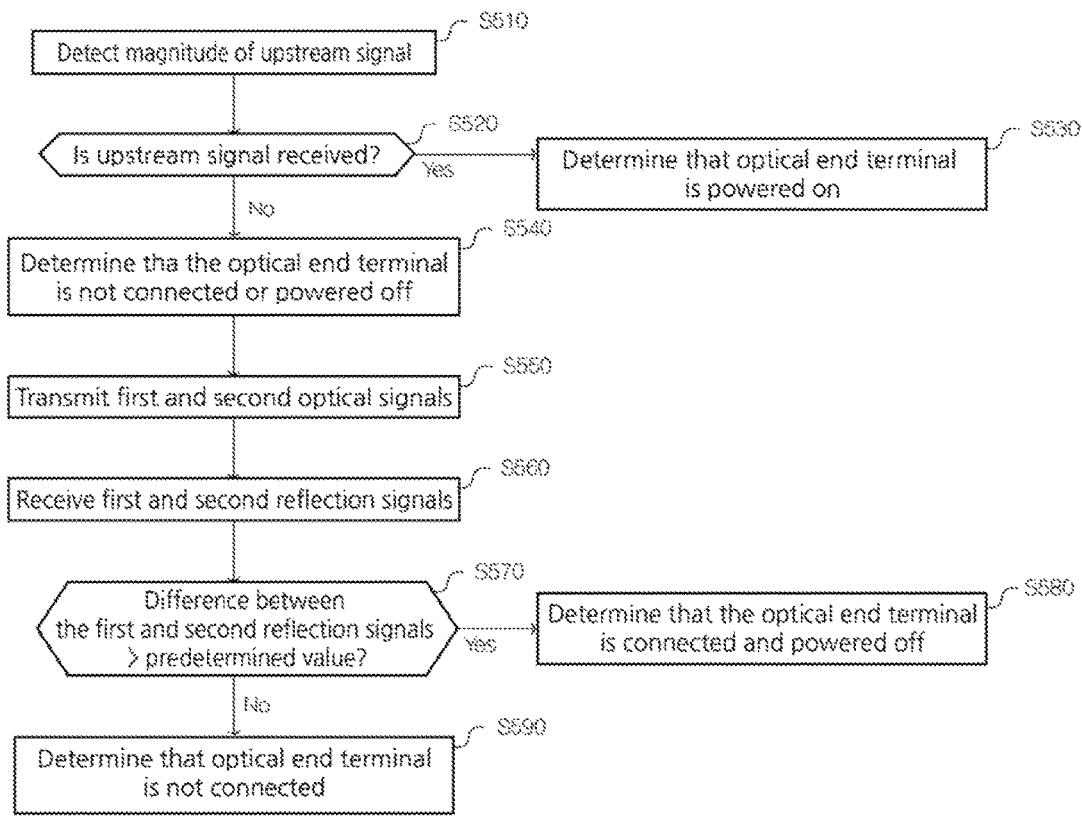
FIG. 5 illustrates a flow chart of an optical end monitoring method according to a non-limiting exemplary embodiment of the present disclosure.

FIG. 5 illustrates a flow chart of an optical end monitoring method according to a non-limiting exemplary embodiment of the present disclosure.

Referring to FIG. 5, the optical end monitoring apparatus 100 may detect (or measure) a magnitude of the upstream signal 13 transmitted by an optical end terminal 30-1 in an operation of S510, checking whether the upstream signal 13 is received in an operation of S520. If the upstream signal 13 is received (e.g., if the magnitude of the upstream signal 13 is more than a predetermined value), the optical end monitoring apparatus 100 may determine that the optical end terminal is "connected to the optical cable 21 and powered on to be in a normal operation" in an operation (S530) and may display, through the display unit 190, to the effect of the decision made above.

If the upstream signal 13 is not received (e.g., if the magnitude of the upstream signal 13 is equal to or less than the predetermined value or the upstream signal 13 is not detected), the optical end monitoring apparatus 100 may determine that the optical end terminal is not connected to the optical cable 21 or powered off to be in an abnormal operation in an operation (S540) and may display, through the display unit 190, to the effect of the decision made above.

Further, the optical end monitoring apparatus 100 may generate the first optical signal S1 with the first wavelength λ1 and the second optical signal S2 with the second wavelength λ2 using the optical transmitting unit 110 to transmit the first and second optical signals S1 and S2 to the optical end terminal 30-1 in an operation S550. In addition, the optical end monitoring apparatus 100 may receive the first and second reflection signals S1_R and S2_R, in an operation of S560, corresponding to the first and second optical signals S1 and S2 are reflected through the optical end terminal 30-1 and a cutting edge of the optical cable 21, respectively. In addition, the optical end monitoring apparatus 100 may check whether a difference between the first and second reflection signals S1_R and S2_R is more than a predetermined value in an operation of SS570.

If the difference between the first and second reflection signals S1_R and S2_R is more than the predetermined value (Yes), the optical end monitoring apparatus 100 may determine that the optical end terminal is connected to the optical cable 21 and powered off in an operation of S580, and may display, through the display unit 190, to the effect of the decision made above.

Further, if the difference between the first and second reflection signals S1_R and S2_R is equal to or less than the predetermined value (No), the optical end monitoring apparatus 100 may determine that the optical end terminal is not connected to the optical cable 21, the optical cable 21 is cut off, or patch codes are disconnected in an operation of S590, and may display, through the display unit 190, to the effect of the decision made above.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. An optical end monitoring apparatus in an optical communication network connected over an optical cable, comprising:
   an optical transmitting unit configured to generate a first optical signal with a first wavelength and a second optical signal with a second wavelength, and to transmit the generated first and second optical signals toward an optical end terminal over the optical cable;
   an optical receiving unit configured to receive a first reflection signal corresponding to the first optical signal and a second reflection signal corresponding to the second optical signal, and to provide first and second magnitudes of the respective first and second reflection signals to a decision unit; and
   the decision unit configured to determine whether the optical end terminal is connected to the optical cable at an optical end of the optical communication network, using a difference between the first and second magnitudes,
   wherein the decision unit determines that the optical end terminal is not connected to the optical cable when the difference between the first and second magnitudes is equal to or less than a first predetermined value,
   wherein the decision unit determines that the optical end terminal is connected to the optical cable when the difference between the first and second magnitudes is more than the first predetermined value.

2. The apparatus of claim 1,
   wherein the optical receiving unit is further configured to receive a third optical signal generated by the optical end terminal,
   wherein the decision unit determines that the optical end terminal is connected and powered on when a magnitude of the received third optical signal is more than a second predetermined value,
   wherein the decision unit determines that the optical end terminal is connected and powered off when the magnitude of the received third optical signal is equal to or less than the second predetermined value.

3. The apparatus of claim 1,
   wherein the first and second wavelengths are selected such that a difference between first and second reflection coefficients of the respective first and second optical signals with respect to at least one optical element in the optical end terminal is more than a third predetermined value.

4. The apparatus of claim 1,
wherein the optical transmitting unit comprises:
a first light source generating the first optical signal; and
a second light source generating the second optical signal.

5. The apparatus of claim 1,
wherein the optical receiving unit comprises:
a first optical filter passing the first reflection signal with the first wavelength;
a first light detection element receiving an output signal of the first optical filter to detect a first magnitude of the output signal of the first optical filter;
a second optical filter passing the second reflection signal with the second wavelength; and
a second light detection element receiving an output signal of the second optical filter to detect a second magnitude of the output signal of the second optical filter.

6. An optical end monitoring method in an optical communication network connected over an optical cable, comprising:
checking whether an upstream signal transmitted from an optical end terminal is received, wherein the optical end terminal is in vicinity of an optical end of the optical communication network;
determining that the optical end terminal is powered on when the upstream signal is received;
transmitting a first optical signal with a first wavelength and a second optical signal with a second wavelength toward the optical end terminal over the optical cable when the upstream signal is not received;
receiving a first reflection signal corresponding to the first optical signal and a second reflection signal corresponding to the second optical signal; and
determining whether the optical end terminal is connected to the optical cable based on a difference between a first magnitude of the first reflection signal and a second magnitude of the second reflection signal.

7. The method of claim 6,
wherein checking whether the upstream signal transmitted from the optical end terminal is received comprises:
determining that the upstream signal is not received when a magnitude of the upstream signal is equal to or less than a first determined value; and
determining that the upstream signal is received when the magnitude of the upstream signal is more than the first determined value.

8. The method of claim 6,
wherein determining whether the optical end terminal is connected to the optical cable based on the difference between the first magnitude of the first reflection signal and the second magnitude of the second reflection signal comprises:
determining that the optical end terminal is not connected to the optical cable when the difference between the first magnitude and the second magnitude is equal to or less than a second predetermined value; and
determining that the optical end terminal is connected to the optical cable and powered off when the difference between the first magnitude and the second magnitude is more than a second predetermined value.

9. The method of claim 6,
wherein the first and second wavelengths are selected such that a difference between first and second reflection coefficients of the respective first and second optical signals with respect to at least one optical element in the optical end terminal is more than a third predetermined value.

10. The method of claim 6,
wherein a wavelength of the upstream signal and the first wavelength of the first optical signal is the same as each other, and
wherein the first optical signal is not generated prior to the checking whether the upstream signal transmitted from the optical end terminal is received.

* * * * *